United States Patent
Wang et al.

(10) Patent No.: US 11,748,376 B1
(45) Date of Patent: Sep. 5, 2023

(54) SELECTION OF DATA FOR TRANSMISSION FROM DIFFERENT ASYNCHRONOUS DATA REPLICATION SESSIONS RUNNING ON A STORAGE SYSTEM

(71) Applicant: Dell Products L.P., Round Rock, TX (US)

(72) Inventors: Nan Wang, Chengdu (CN); Chaojun Zhao, Chengdu (CN)

(73) Assignee: Dell Products L.P., Round Rock, TX (US)

( * ) Notice: Subject to any disclaimer, the term of this patent is extended or adjusted under 35 U.S.C. 154(b) by 3 days.

(21) Appl. No.: 17/728,032

(22) Filed: Apr. 25, 2022

(30) Foreign Application Priority Data

Apr. 15, 2022 (CN) .......................... 202210397402.4

(51) Int. Cl.
*G06F 16/00* (2019.01)
*G06F 16/27* (2019.01)

(52) U.S. Cl.
CPC .................................. *G06F 16/273* (2019.01)

(58) Field of Classification Search
CPC .................................................... G06F 16/273
USPC ........................................................ 707/613
See application file for complete search history.

(56) References Cited

U.S. PATENT DOCUMENTS

| | | | |
|---|---|---|---|
| 11,436,097 B1 * | 9/2022 | Kumar | G06F 11/008 |
| 2012/0023209 A1 * | 1/2012 | Fletcher | H04L 12/40195 |
| | | | 709/223 |

OTHER PUBLICATIONS

NVM Express, "NVM Express Base Specification, Revision 2.0a," NVM Express, Jul. 23, 2021, 454 pages.
Dell Technologies "Dell EMC Unity: Replication Technologies," Technical White Paper, H15088.7, Jun. 2021, 82 pages.
Dell Technologies, "Dell EMC PowerStore: Replication Technologies," White Paper, H18153.5, Nov. 2021, 43 pages.
K. Swindell, "Using Dell PS Series Asynchronous Replication," Dell Storage Engineering, A Dell Best Practices Guide, TR1052, Jun. 2015, 47 pages.
Dell, "Asynchronous Remote Replication Technical Report—Dell PowerVault MD3 Storage Arrays," White Paper, Dec. 2012, 23 pages.
Z. Patel et al., "Design and Implementation of Low Latency Weighted Round Robin (LL-WRR) Scheduling for High Speed Networks," International Journal of Wireless & Mobile Networks, vol. 6, No. 4, Aug. 2014, 13 pages.

* cited by examiner

*Primary Examiner* — Chelcie L Daye
(74) *Attorney, Agent, or Firm* — Ryan, Mason & Lewis, LLP

(57) ABSTRACT

An apparatus comprises a processing device configured to identify a set of asynchronous data replication sessions currently running on a storage system each associated with a corresponding recovery point objective, and responsive to determining that at least one of the asynchronous data replication sessions has a current synchronization time that exceeds its corresponding recovery point objective for a first iteration of a given time window, to compute a session weight for each of the asynchronous data replication sessions. The processing device is also configured to select, for a second iteration of the given time window, data for transmission from the asynchronous data replication sessions based at least in part on the computed session weights. The processing device is further configured to transmit, during the second iteration of the given time window, the selected data.

20 Claims, 8 Drawing Sheets

| NAME | SESSION 1 | SESSION 2 | SESSION 3 |
|---|---|---|---|
| RECOVERY POINT OBJECTIVE (RPO) (MINUTES) | 5 | 10 | 20 |

500

| NAME | SESSION 1 | SESSION 2 | SESSION 3 |
|---|---|---|---|
| $Last\_Sync\_Time_i$ | 18:00 | 18:00 | 18:00 |
| $Current\_Sync\_Start\_Time_i$ | 18:08 | 18:05 | 18:10 |

SELECTION OF DATA FOR TRANSMISSION FROM DIFFERENT ASYNCHRONOUS DATA REPLICATION SESSIONS RUNNING ON A STORAGE SYSTEM

RELATED APPLICATION

The present application claims priority to Chinese Patent Application No. 202210397402.4, filed on Apr. 15, 2022 and entitled "Selection of Data for Transmission from Different Asynchronous Data Replication Sessions Running on a Storage System," which is incorporated by reference herein in its entirety.

FIELD

The field relates generally to information processing, and more particularly to storage in information processing systems.

BACKGROUND

Storage arrays and other types of storage systems are often shared by multiple host devices over a network. Applications running on the host devices each include one or more processes that perform the application functionality. Such processes issue input-output (IO) operation requests for delivery to the storage systems. Storage controllers of the storage systems service such requests for IO operations. In some information processing systems, multiple storage systems may be used to form a storage cluster.

SUMMARY

Illustrative embodiments of the present disclosure provide techniques for selection of data for transmission from different asynchronous data replication sessions running on a storage system.

In one embodiment, an apparatus comprises at least one processing device comprising a processor coupled to a memory. The at least one processing device is configured to perform the steps of identifying a set of two or more asynchronous data replication sessions currently running on a storage system, each of the two or more asynchronous data replication sessions being associated with a corresponding recovery point objective, and determining whether any of the asynchronous data replication sessions in the set of two or more asynchronous data replication sessions has a current synchronization time that exceeds its corresponding recovery point objective for a first iteration of a given time window. The at least one processing device is also configured to perform the steps of, responsive to determining that at least one of the asynchronous data replication sessions in the set of two or more asynchronous data replication sessions has a current synchronization time that exceeds its corresponding recovery point objective for the first iteration of the given time window, computing a session weight for each of the asynchronous data replication sessions in the set of two or more asynchronous data replication sessions and selecting, for a second iteration of the given time window, data for transmission from each of the asynchronous data replication sessions in the set of two or more asynchronous data replication sessions based at least in part on the computed session weights. The at least one processing device is further configured to perform the step of transmitting, during the second iteration of the given time window, the selected data from each of the asynchronous data replication sessions in the set of two or more asynchronous data replication sessions.

These and other illustrative embodiments include, without limitation, methods, apparatus, networks, systems and processor-readable storage media.

BRIEF DESCRIPTION OF THE DRAWINGS

FIGS. 5A and 5B show an example application of balancing among a set of asynchronous replication sessions in an illustrative embodiment.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1:
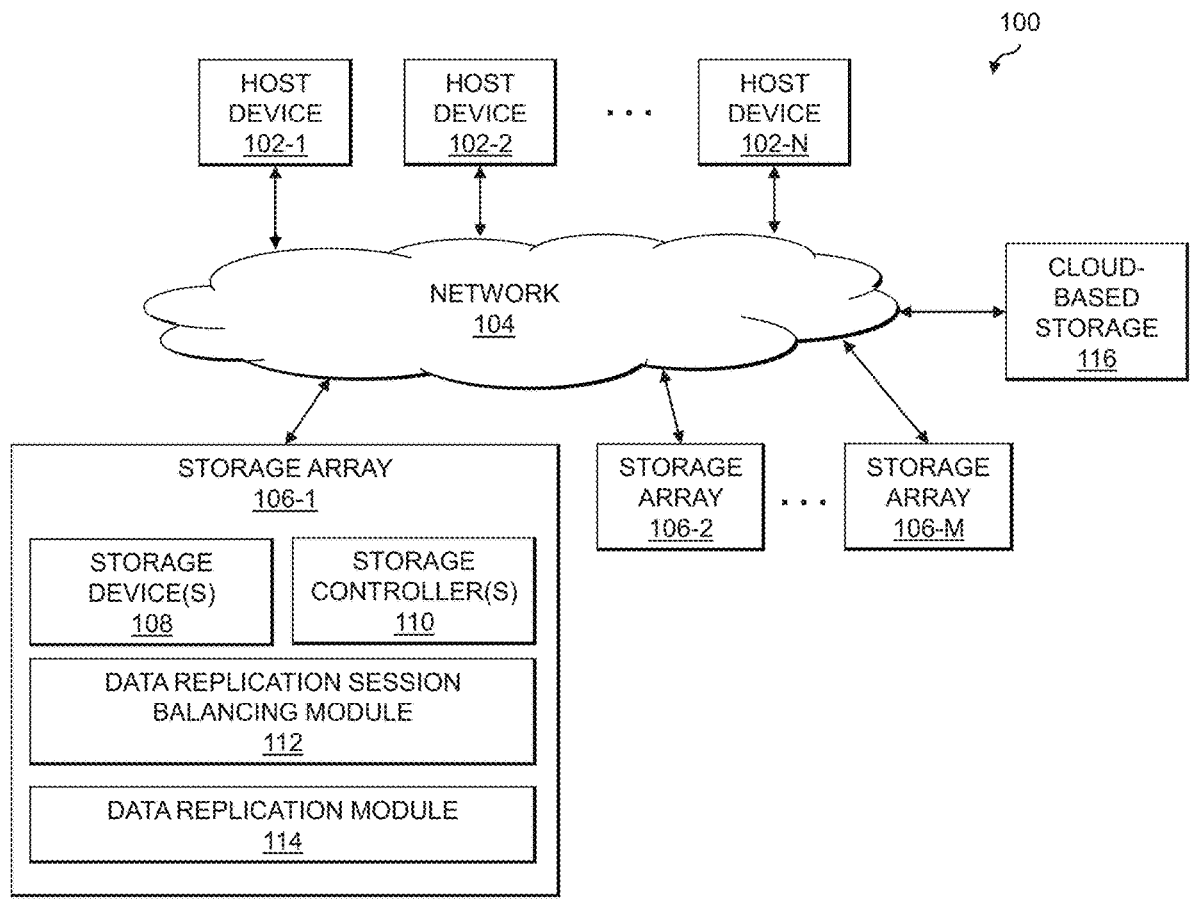
FIG. 1 is a block diagram of an information processing system for selection of data for transmission from different asynchronous data replication sessions running on a storage system in an illustrative embodiment.

FIG. 1 shows an information processing system 100 configured in accordance with an illustrative embodiment to provide functionality for selection of data for transmission from different asynchronous data replication sessions running on a storage system. The information processing system 100 comprises one or more host devices 102-1, 102-2, . . . 102-N (collectively, host devices 102) that communicate over a network 104 with one or more storage arrays 106-1, 106-2, . . . 106-M (collectively, storage arrays 106). The network 104 may comprise a storage area network (SAN).

The storage array 106-1, as shown in FIG. 1, comprises a plurality of storage devices 108 each storing data utilized by one or more applications running on the host devices 102. The storage devices 108 are illustratively arranged in one or more storage pools. The storage array 106-1 also comprises one or more storage controllers 110 that facilitate input/output (IO) processing for the storage devices 108. The storage array 106-1 and its associated storage devices 108 are an example of what is more generally referred to herein as a "storage system." This storage system in the present embodiment is shared by the host devices 102, and is therefore also referred to herein as a "shared storage system." In embodiments where there is only a single host device 102, the host device 102 may be configured to have exclusive use of the storage system.

The host devices 102 illustratively comprise respective computers, servers or other types of processing devices capable of communicating with the storage arrays 106 via the network 104. For example, at least a subset of the host devices 102 may be implemented as respective virtual machines of a compute services platform or other type of processing platform. The host devices 102 in such an arrangement illustratively provide compute services such as execution of one or more applications on behalf of each of one or more users associated with respective ones of the host devices 102.

The term "user" herein is intended to be broadly construed so as to encompass numerous arrangements of human, hardware, software or firmware entities, as well as combinations of such entities.

Compute and/or storage services may be provided for users under a Platform-as-a-Service (PaaS) model, an Infrastructure-as-a-Service (IaaS) model, a Function-as-a-Service (FaaS) model and/or a Storage-as-a-Service (STaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The storage devices 108 of the storage array 106-1 may implement logical units (LUNs) configured to store objects for users associated with the host devices 102. These objects can comprise files, blocks or other types of objects. The host devices 102 interact with the storage array 106-1 utilizing read and write commands as well as other types of commands that are transmitted over the network 104. Such commands in some embodiments more particularly comprise Small Computer System Interface (SCSI) commands, although other types of commands can be used in other embodiments. A given IO operation as that term is broadly used herein illustratively comprises one or more such commands. References herein to terms such as "input-output" and "IO" should be understood to refer to input and/or output. Thus, an IO operation relates to at least one of input and output.

Also, the term "storage device" as used herein is intended to be broadly construed, so as to encompass, for example, a logical storage device such as a LUN or other logical storage volume. A logical storage device can be defined in the storage array 106-1 to include different portions of one or more physical storage devices. Storage devices 108 may therefore be viewed as comprising respective LUNs or other logical storage volumes.

The storage devices 108 of the storage array 106-1 can be implemented using solid state drives (SSDs). Such SSDs are implemented using non-volatile memory (NVM) devices such as flash memory. Other types of NVM devices that can be used to implement at least a portion of the storage devices 108 include non-volatile random access memory (NVRAM), phase-change RAM (PC-RAM), magnetic RAM (MRAM), resistive RAM (RRAM), etc. These and various combinations of multiple different types of NVM devices or other storage devices may also be used. For example, hard disk drives (HDDs) can be used in combination with or in place of SSDs or other types of NVM devices. Accordingly, numerous other types of electronic or magnetic media can be used in implementing at least a subset of the storage devices 108. In some embodiments, the storage array 106-1 is assumed to comprise a persistent memory that is implemented using a flash memory or other type of non-volatile memory of the storage array 106-1. The persistent memory is further assumed to be separate from the storage devices 108 of the storage array 106-1, although in other embodiments the persistent memory may be implemented as a designated portion or portions of one or more of the storage devices 108.

In some embodiments, the storage arrays 106 may be part of a storage cluster (e.g., where the storage arrays 106 may be used to implement one or more storage nodes in a cluster storage system comprising a plurality of storage nodes interconnected by one or more networks), and the host devices 102 are assumed to submit IO operations to be processed by the storage cluster. Different ones of the storage arrays 106 may be associated with different sites. For example, the storage array 106-1 may be at a first site while the storage array 106-2 may be at a second site that is potentially geographically remote from the first site. At least one of the storage controllers of the storage arrays 106 (e.g., the storage controller 110 of storage array 106-1) is assumed to implement functionality for intelligent data replication. Such data replication may be performed across the storage devices 108 of the storage array 106-1, across multiple ones of the storage arrays 106, between a storage cluster comprising the storage arrays 106 and one or more external storage systems such as cloud-based storage 116, etc. Such intelligent data replication functionality is provided via a data replication session balancing module 112 and a data replication module 114.

The data replication session balancing module 112 is configured to identify a set of two or more asynchronous data replication sessions currently running on a storage system (e.g., the storage array 106-1, a clustered storage system comprising two or more of the storage arrays 106, etc.). Each of the two or more asynchronous data replication sessions is associated with a corresponding recovery point objective (RPO). The data replication session balancing module 112 is also configured to determine whether any of the asynchronous data replication sessions in the set of two or more asynchronous data replication sessions has a current synchronization time that exceeds its corresponding RPO for a first iteration of a given time window. The data replication session balancing module 112 is further configured, responsive to determining that at least one of the asynchronous data replication sessions in the set of two or more asynchronous data replication sessions has a current synchronization time that exceeds its corresponding RPO for the first iteration of the given time window, to compute a session weight for each of the asynchronous data replication sessions in the set of two or more asynchronous data replication sessions. The data replication session balancing module 112 is further configured to select, for a second iteration of the given time window, data for transmission from each of the asynchronous data replication sessions in the set of two or more asynchronous data replication sessions based at least in part on the computed session weights. The data replication module 114 is configured to transmit, during the second iteration of the given time window, the selected data from each of the asynchronous data replication sessions in the set of two or more asynchronous data replication sessions.

Although in the FIG. 1 embodiment the data replication session balancing module 112 and the data replication module 114 are shown as being implemented internal to the storage array 106-1 and outside the storage controllers 110, in other embodiments one or both of the data replication session balancing module 112 and the data replication module 114 may be implemented at least partially internal to the storage controllers 110 or at least partially outside the storage array 106-1, such as on one of the host devices 102, one or more other ones of the storage arrays 106-2 through 106-M, on one or more servers external to the host devices 102 and the storage arrays 106 (e.g., including on a cloud computing platform or other type of information technology (IT) infrastructure), etc. Further, although not shown in FIG. 1, other ones of the storage arrays 106-2 through 106-M may implement respective instances of the data replication session balancing module 112 and the data replication module 114.

At least portions of the functionality of the data replication session balancing module 112 and the data replication module 114 may be implemented at least in part in the form of software that is stored in memory and executed by a processor.

As noted above, the storage arrays 106 in some embodiments are assumed to be part of a storage cluster. The storage cluster may provide or implement multiple distinct storage tiers of a multi-tier storage system. By way of example, a given multi-tier storage system may comprise a fast tier or performance tier implemented using flash storage devices or other types of SSDs, and a capacity tier implemented using HDDs, possibly with one or more such tiers being server based. A wide variety of other types of storage devices and multi-tier storage systems can be used in other embodiments, as will be apparent to those skilled in the art. The particular storage devices used in a given storage tier may be varied depending on the particular needs of a given embodiment, and multiple distinct storage device types may be used within a single storage tier. As indicated previously, the term "storage device" as used herein is intended to be broadly construed, and so may encompass, for example, SSDs, HDDs, flash drives, hybrid drives or other types of storage products and devices, or portions thereof, and illustratively include logical storage devices such as LUNs.

It should be appreciated that a multi-tier storage system may include more than two storage tiers, such as one or more "performance" tiers and one or more "capacity" tiers, where the performance tiers illustratively provide increased IO performance characteristics relative to the capacity tiers and the capacity tiers are illustratively implemented using relatively lower cost storage than the performance tiers. There may also be multiple performance tiers, each providing a different level of service or performance as desired, or multiple capacity tiers.

The host devices 102 and storage arrays 106 in the FIG. 1 embodiment are assumed to be implemented using at least one processing platform, with each processing platform comprising one or more processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The host devices 102 and the storage arrays 106 may be implemented on respective distinct processing platforms, although numerous other arrangements are possible. For example, in some embodiments at least portions of one or more of the host devices 102 and one or more of the storage arrays 106 are implemented on the same processing platform. One or more of the storage arrays 106 can therefore be implemented at least in part within at least one processing platform that implements at least a subset of the host devices 102.

The network 104 may be implemented using multiple networks of different types to interconnect storage system components. For example, the network 104 may comprise a SAN that is a portion of a global computer network such as the Internet, although other types of networks can be part of the SAN, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

Although in some embodiments certain commands used by the host devices 102 to communicate with the storage arrays 106 illustratively comprise SCSI commands, other types of commands and command formats can be used in other embodiments. For example, some embodiments can implement IO operations utilizing command features and functionality associated with NVM Express (NVMe), as described in the NVMe Specification, Revision 2.0a, July 2021, which is incorporated by reference herein. Other storage protocols of this type that may be utilized in illustrative embodiments disclosed herein include NVMe over Fabric, also referred to as NVMeoF, and NVMe over Transmission Control Protocol (TCP), also referred to as NVMe/TCP.

As mentioned above, communications between the host devices 102 and the storage arrays 106 may utilize PCIe connections or other types of connections implemented over one or more networks. For example, illustrative embodiments can use interfaces such as Internet SCSI (iSCSI), Serial Attached SCSI (SAS) and Serial ATA (SATA). Numerous other interfaces and associated communication protocols can be used in other embodiments.

The storage arrays 106 in some embodiments may be implemented as part of a cloud-based system.

It should therefore be apparent that the term "storage array" as used herein is intended to be broadly construed, and may encompass multiple distinct instances of a commercially-available storage array.

Other types of storage products that can be used in implementing a given storage system in illustrative embodiments include software-defined storage, cloud storage, object-based storage and scale-out storage. Combinations of multiple ones of these and other storage types can also be used in implementing a given storage system in an illustrative embodiment.

In some embodiments, a storage system comprises first and second storage arrays arranged in an active-active configuration. For example, such an arrangement can be used to ensure that data stored in one of the storage arrays is replicated to the other one of the storage arrays utilizing a synchronous replication process. Such data replication across the multiple storage arrays can be used to facilitate failure recovery in the system 100. One of the storage arrays may therefore operate as a production storage array relative to the other storage array which operates as a backup or recovery storage array.

It is to be appreciated, however, that embodiments disclosed herein are not limited to active-active configurations or any other particular storage system arrangements. Accordingly, illustrative embodiments herein can be configured using a wide variety of other arrangements, including, by way of example, active-passive arrangements, active-active Asymmetric Logical Unit Access (ALUA) arrangements, and other types of ALUA arrangements.

These and other storage systems can be part of what is more generally referred to herein as a processing platform comprising one or more processing devices each comprising a processor coupled to a memory. A given such processing device may correspond to one or more virtual machines or other types of virtualization infrastructure such as Docker containers or other types of LXCs. As indicated above, communications between such elements of system 100 may take place over one or more networks.

The term "processing platform" as used herein is intended to be broadly construed so as to encompass, by way of illustration and without limitation, multiple sets of processing devices and one or more associated storage systems that are configured to communicate over one or more networks. For example, distributed implementations of the host devices 102 are possible, in which certain ones of the host devices 102 reside in one data center in a first geographic location while other ones of the host devices 102 reside in one or more other data centers in one or more other geographic locations that are potentially remote from the first geographic location. The storage arrays 106 may be implemented at least in part in the first geographic location, the second geographic location, and one or more other geographic locations. Thus, it is possible in some implementations of the system 100 for different ones of the host devices 102 and the storage arrays 106 to reside in different data centers.

Numerous other distributed implementations of the host devices 102 and the storage arrays 106 are possible. Accordingly, the host devices 102 and the storage arrays 106 can also be implemented in a distributed manner across multiple data centers.

Additional examples of processing platforms utilized to implement portions of the system 100 in illustrative embodiments will be described in more detail below in conjunction with FIGS. 6 and 7.

It is to be understood that the particular set of elements shown in FIG. 1 for selection of data for transmission from different asynchronous data replication sessions running on a storage system is presented by way of illustrative example only, and in other embodiments additional or alternative elements may be used. Thus, another embodiment may include additional or alternative systems, devices and other network entities, as well as different arrangements of modules and other components.

It is to be appreciated that these and other features of illustrative embodiments are presented by way of example only, and should not be construed as limiting in any way.

An exemplary process for selection of data for transmission from different asynchronous data replication sessions running on a storage system will now be described in more detail with reference to the flow diagram of FIG. 2. It is to be understood that this particular process is only an example, and that additional or alternative processes for selection of data for transmission from different asynchronous data replication sessions running on a storage system may be used in other embodiments.

In this embodiment, the process includes steps 200 through 208. These steps are assumed to be performed by the data replication session balancing module 112 and the data replication module 114. The process begins with step 200, identifying a set of two or more asynchronous data replication sessions currently running on a storage system, each of the two or more asynchronous data replication sessions being associated with a corresponding RPO.

In step 202, a determination is made as to whether any of the asynchronous data replication sessions in the set of two or more asynchronous data replication sessions has a current synchronization time that exceeds its corresponding RPO for a first iteration of a given time window. A length of the given time window may be set as a least common multiple of permissible synchronization times specified by the RPOs corresponding to each of the set of two or more asynchronous data replication sessions. The current synchronization time for a given asynchronous data replication session in the set of two or more asynchronous data replication sessions may be determined based at least in part on a synchronization cost time of current delta data for the given asynchronous data replication session transferred during the first iteration of the given time window. The current delta data for the given asynchronous data replication session transferred during the first iteration of the given time window may be calculated based on a comparison of two storage system snapshot deltas for the given asynchronous data replication session. The synchronization cost time may comprise a difference between a last synchronization time for the given asynchronous data replication session and a start time of a current synchronization session in the first iteration of the given time window for the given asynchronous data replication session.

A session weight is computed for each of the asynchronous data replication sessions in the set of two or more asynchronous data replication sessions in step 204, responsive to determining that at least one of the asynchronous data replication sessions in the set of two or more asynchronous data replication sessions has a current synchronization time that exceeds its corresponding RPO for the first iteration of the given time window. Computing a given session weight for a given asynchronous data replication session in the set of two or more asynchronous data replication sessions may be based at least in part on (i) a size of delta data for the given asynchronous data replication session that is transferred during the first iteration of the given time window and (ii) a given RPO associated with the given asynchronous data replication session. Computing the given session weight for the given asynchronous data replication session may be further based at least in part on (iii) ratios of the sizes of delta data and the RPOs for all of the set of two or more asynchronous data replications sessions.

In step 206, data for transmission from each of the asynchronous data replication sessions in the set of two or more asynchronous data replication sessions is selected for a second iteration of the given time window based at least in part on the computed session weights. Step 206 may comprise performing a weighted round robin balancing algorithm utilizing the computed session weights. The selected data from each of the asynchronous data replication sessions in the set of two or more asynchronous data replications sessions is transmitted in step 208 during the second iteration of the given time window.

Figure 2:
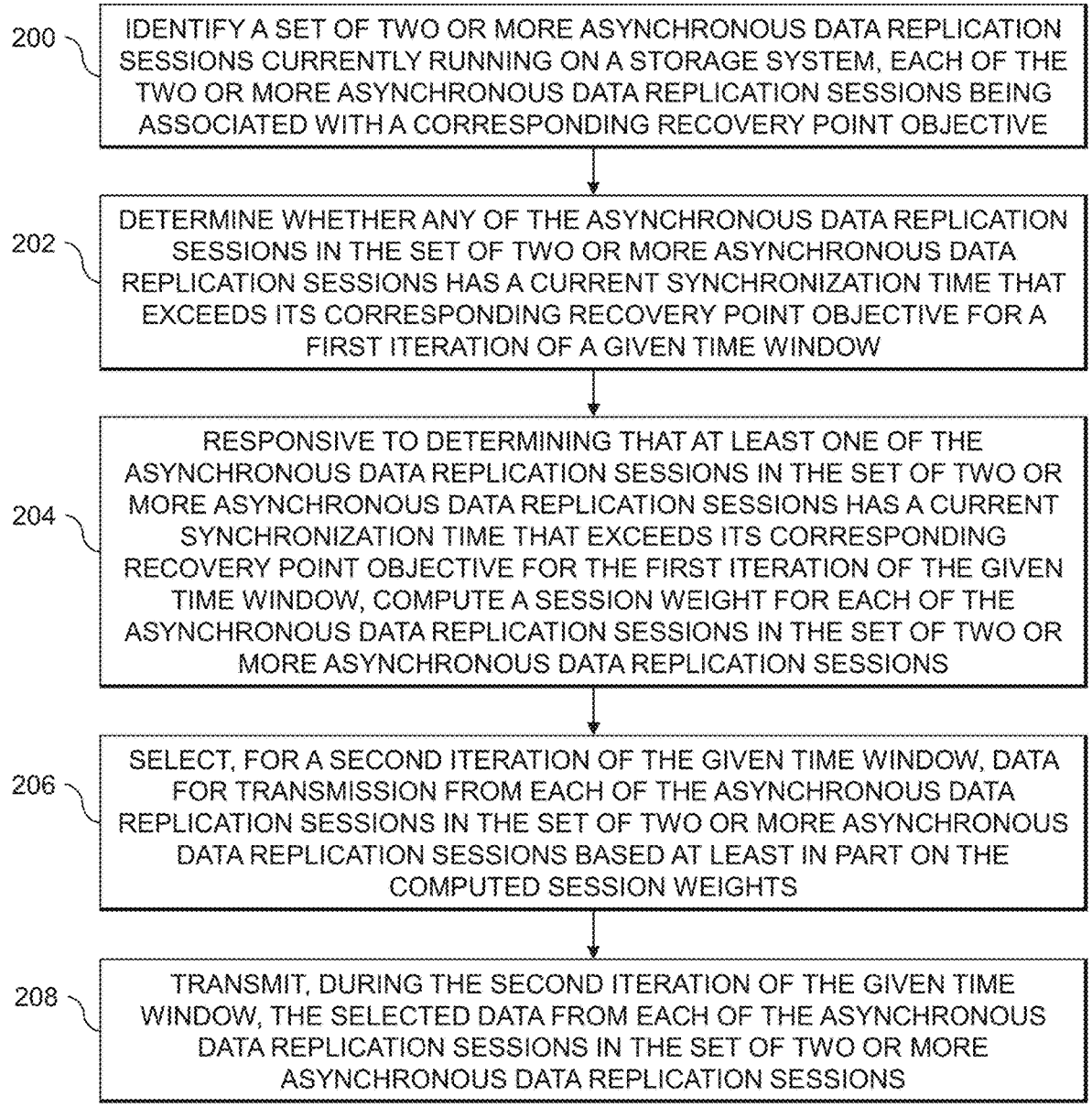
FIG. 2 is a flow diagram of an exemplary process for selection of data for transmission from different asynchronous data replication sessions running on a storage system in an illustrative embodiment.

The FIG. 2 process, in some embodiments, further comprises determining an amount of a total asynchronous data replication capacity of the storage system that is allocated to the set of two or more asynchronous data replication sessions during the first iteration of the given time window and, responsive to determining that the amount of the total asynchronous data replication capacity of the storage system that is allocated to the set of two or more asynchronous data replication sessions during the first iteration of the given time window exceeds a designated threshold, initiating one or more remediation actions on the storage system. At least one of the one or more remediation actions may comprise adjusting a given RPO associated with a given asynchronous data replication session in the set of two or more asynchronous data replication sessions. At least one of the one or more remediation actions may comprise generating an alert indicating that at least one of: asynchronous data replication capacity of the storage system is running low; and at least a given asynchronous data replication session in the set of two or more asynchronous data replication sessions will not meet its corresponding RPO.

At least one of the one or more remediation actions may comprise adjusting the total asynchronous data replication capacity of the storage system. The total asynchronous data replication capacity of the storage system may be determined based at least in part on a physical capacity of one or more storage ports of the storage system allocated for performing asynchronous data replication for the storage system, and adjusting the total asynchronous data replication capacity of the storage system may comprise allocating one or more additional storage ports of the storage system for asynchronous data replication. The total asynchronous data replication capacity of the storage system may also or alternatively be determined based at least in part on a user-specified asynchronous data replication throttling threshold, and adjusting the total asynchronous data replication capacity of the storage system may comprise increasing the user-specified asynchronous data replication throttling threshold.

Asynchronous replication is a feature for data protection which may be implemented in various storage systems for different types of storage objects or other data stored thereon. Asynchronous replication may be performed between different sites (e.g., a primary site and a secondary or replication site), or locally within a same site (e.g., between different storage devices of a same storage array, between storage arrays of a same storage cluster, combinations thereof, etc.). Asynchronous replication approaches provide various advantages for long-distance data protection. Asynchronous replication, however, is unlike a storage pool or a file system, where the total capacity—both allocated and available, is obvious to end-users. The techniques described herein provide a solution that helps end-users understand asynchronous replication capacity, and enables planning and monitoring of asynchronous data replication session sync status at runtime to enable self-rebalancing when any related condition deviates.

In some cases, multiple asynchronous data replication sessions coexist (e.g., run simultaneously, or at least in a partially overlapping fashion) in a storage array. The multiple asynchronous data replication sessions (also referred to as asynchronous replication sessions, async replication sessions, or replication sessions) consume the same bandwidth resources, but potentially at different paces. To provide the desired data protection via asynchronous replication, it is crucial to have the data synchronization time of each replication session be less than its specified recovery point objective (RPO). The techniques described herein provide an approach for defining asynchronous data replication capacity, and for presenting the asynchronous data replication capacity to end-users in real-time. The limited bandwidth made available for asynchronous data replication is one of the critical resources for asynchronous replication sessions running on a storage array. When there are multiple replication sessions syncing at the same time, they will compete for bandwidth and cause the data syncing time to be extended. In some embodiments, an asynchronous replication balancing algorithm is provided, which uses a session delta sync data prediction and weighted round robin (WRR) scheduling to rebalance bandwidth usage among multiple asynchronous data replication sessions (e.g., which may include one or more failed sessions and one or more healthy sessions) automatically.

The steps of the FIG. 2 process are shown in sequential order for clarity and simplicity of illustration only, and certain steps can at least partially overlap with other steps. Additional or alternative steps can be used in other embodiments.

The particular processing operations and other system functionality described in conjunction with the flow diagram of FIG. 2 are presented by way of illustrative example only, and should not be construed as limiting the scope of the disclosure in any way. Alternative embodiments can use other types of processing operations for selection of data for transmission from different asynchronous data replication sessions running on a storage system. For example, as indicated above, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of data selection processes for respective different storage systems or different portions of one or more storage systems.

Functionality such as that described in conjunction with the flow diagram of FIG. 2 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Asynchronous data replication is a widely used feature for performing data protection for different types of storage objects, where the replication may be performed locally (e.g., within a given site) or between primary and secondary sites, especially for long-distance data protection. A customer or other end-user may failover to a destination (e.g., where data is replicated to, whether that is a secondary site or different storage resources of a same local site) in the case of disaster, a scheduled maintenance window, etc. Production data will be synced to the destination at a customer or other end-user specified interval in accordance with specified RPOs. For different storage objects, the RPOs of the replication sessions may be varied in a large range based on the importance of the data being replicated. Where multiple asynchronous data replication sessions coexist (e.g., run at the same time, or at least in a partially overlapping manner) in the same storage array, the different replication sessions may consume the same bandwidth resources at potentially different paces. In order to provide the desired data protection via asynchronous data replication, it is crucial to have the data sync time of each of the asynchronous data replication sessions be less than their associated RPOs. Otherwise, this can lead to various problems in the storage system. Such problems may include, by way of example, that a next RPO will be skipped if the current syncing is still ongoing such that data can't be protected in time as a customer or end-user expects and requires. Further, under some extreme conditions at customer sites, basic backup functions may be impacted where syncing time takes too long to finish which will hang sessions. Other replication-related features, such as failover/failback, non-disruptive upgrade (NDU), etc., may also be blocked while time, effort and resources are consumed attempting to recover from failed or faulted replication sessions.

In illustrative embodiments, asynchronous data replication capacity is determined and presented to customers or other end-users in real-time. The limited bandwidth available for asynchronous data replication is a critical resource for the asynchronous data replication sessions that are running on a storage array. When there are multiple replication sessions syncing at the same time, they will compete for bandwidth which can result in extensions of the data syncing time. If each running asynchronous data replication session is able to complete data sync in accordance with its associated RPO, there is more capacity for additional asynchronous data replication sessions in the storage array. If the overall asynchronous data replication capacity of the storage array exceeds a high watermark (e.g., corresponding to the maximum bandwidth that is or can be allocated for asynchronous data replication), then there is insufficient bandwidth for all asynchronous data replication sessions that are currently running on the storage array. Thus, it is very likely to result in out-of-sync problems and alerts will be sent to customers or other end-users.

If some asynchronous data replication sessions fail to complete data sync within their associated RPO times, while the overall asynchronous replication capacity is still under a high watermark, a bandwidth self-balancing mechanism will be triggered. The bandwidth self-balancing mechanism uses session delta sync data prediction and WRR scheduling to rebalance bandwidth usage among different replication sessions (e.g., including failed and healthy sessions) automatically. In the next session sync window, weights are assigned to each of the different replication sessions based on their last sync time and their associated RPOs. All the delta data (e.g., data that is to be synced) of each replication session will be put to a queue in accordance with WRR scheduling before being sent to the network stacks. Failed replication sessions (e.g., those that have missed or are predicted to miss their associated RPOs) will get more bandwidth, while the remaining replication sessions will still be synced within their associated RPOs since the overall asynchronous replication capacity is under the high watermark. If the overall asynchronous replication capacity exceeds the high watermark, the self-rebalancing algorithm will be stopped. Optionally, alerts are generated and sent to customers or other end-users indicating that the asynchronous replication capacity is at its limit or nearly full.

In order to present the replication capacity to a customer or other end-user in a more comprehensive way, in some embodiments metrics are collected for each replication session in a fixed interval (e.g., five minutes) for some specified duration. The specified duration, for example, may be a least common multiple of the RPO times of all asynchronous data replication sessions currently running on the storage array. The following notation is used in the description below:

Iteration, which denotes the sample data collection cycle (e.g., which may be the smallest RPO of all the currently running asynchronous data replication sessions);

Session_Status, which denotes the current session status inherited from a command line utility such as uemcli;

k, which denotes the total number of currently running replication sessions;

Max_Bandwidth, which denotes the maximum bandwidth available for asynchronous data replication (e.g., the smaller of a bandwidth of the storage array port(s) used for asynchronous data replication and a throttling value specified by a customer or other end-user);

Last_Sync_Time$_i$, which denotes the last sync time of a current replication session i;

Current_Sync_Start_Time$_i$, which denotes when a current replication session i started (if the current replication session i's status is "syncing"), where this data will be retrieved directly from logs or when the iteration ends;

Updated_Last_Sync_Time$_i$, which denotes that the process will check the replication session i's Last_Sync_Time$_i$ again when the iteration ends;

Time$_i$, which denotes the syncing cost time of current data delta for replication session i, which may be computed according to Updated_Last_Sync_Time$_i$–Current_Sync_Start_Time$_i$;

Data_Delta$_i$, which denotes the data size of replication session i that will be transferred in the current syncing time, which can be calculated by comparing the delta of two system snapshots;

Session_Weight$_i$, which denotes the weight of replication session i, where higher values of Session_Weight$_i$ means that the replication session i is closer to being out of sync within its RPO;

High_Watermark, which denotes the threshold of total asynchronous data replication capacity to trigger an alert and stop self-rebalancing, with the value of High_Watermark being set to a default value (e.g., 90%) that may be adjusted as desired by a customer or other end-user; and RPO$_i$, which denotes the RPO set for replication session i.

The ratio of the data delta from all the replication sessions within the calculated time window to the maximum data that could be synced within the duration indicates the overall replication capacity of a storage array, and is computed according to:

$$f(x) = \frac{\sum_{n=1}^{k}\left(\sum_{n=1}^{j}(\text{Data\_Delta})\right)}{B_M * D_C}$$

where k denotes the number of replication sessions, j denotes the number of calculated duration iteration, $B_M$ denotes the maximum bandwidth (also denoted as Max_Bandwidth), and $D_C$ denotes the calculated duration. If the allocated replication capacity exceeds the threshold of the total capacity, High_Watermark (e.g., 90%), an alert will be generated and sent to the customer or other end-user indicating that the asynchronous data replication capacity is running low. For each replication session i, if the session sync time exceeds the RPO$_i$, this will trigger the bandwidth self-rebalancing algorithm among the currently running replication sessions (e.g., including failed and healthy sessions).

Figure 3:
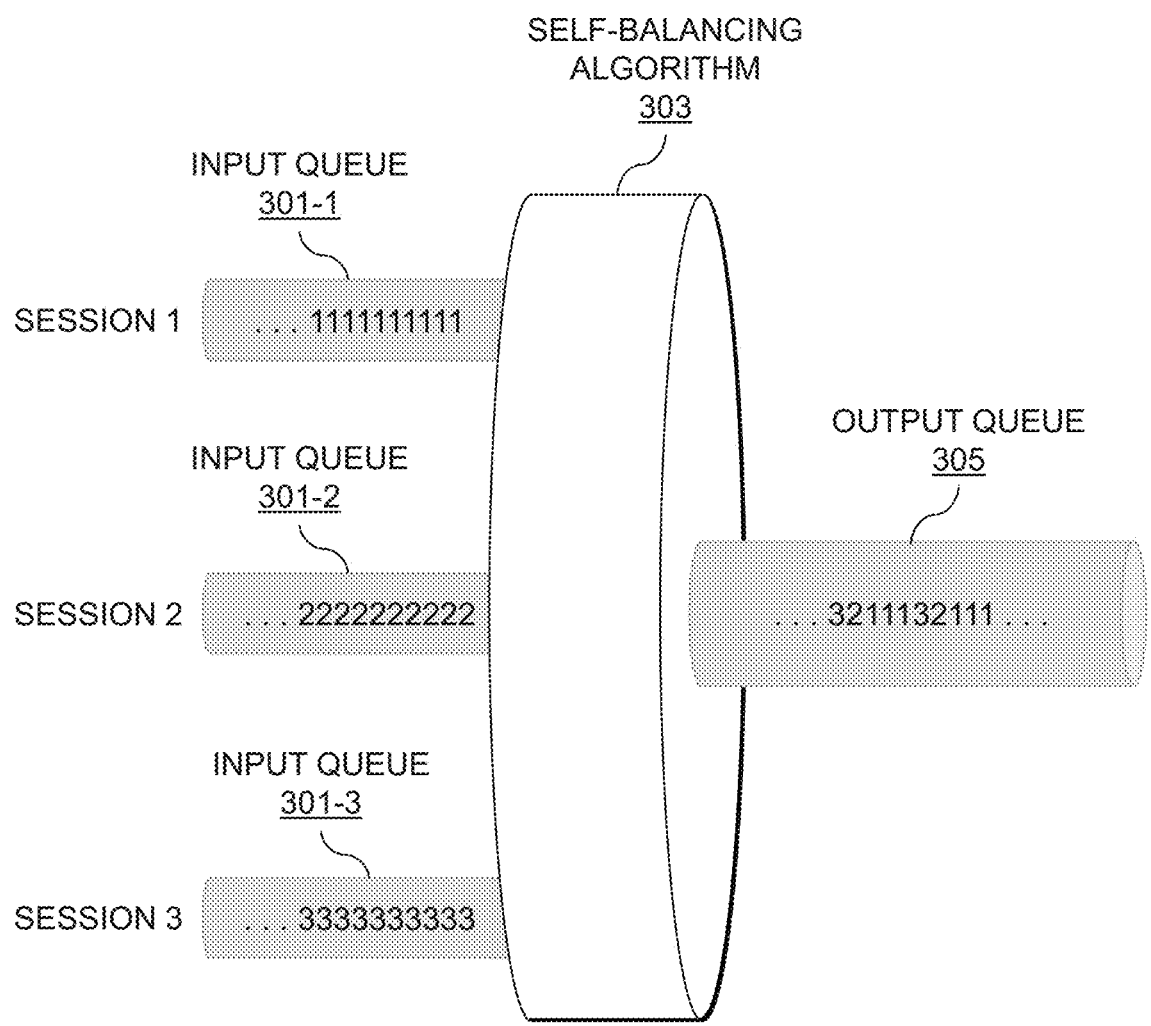
FIG. 3 shows application of an asynchronous replication session balancing algorithm in an illustrative embodiment.

FIG. 3 shows an example implementation, where a self-balancing algorithm 303 is applied to a set of input queues 301-1, 301-2 and 301-3 (collectively, input queues 301) associated with different currently running replication sessions. Data from the replication session 1 in the input queue 301-1 is denoted by 1s, data from the replication session 2 in the input queue 301-2 is denoted by 2s, and data from the replication session 3 in the input queue 301-3 is denoted by 3s. The self-balancing algorithm 303 determines how data should be taken from the input queues 301 and placed in an output queue 305 for transmission from one or more storage array ports designated for transferring data for asynchronous replication. The self-balancing algorithm 303 is based on weight proportions using WRR scheduling. In the FIG. 3 example, the weights for the replication sessions 1, 2 and 3 are 3:1:1 (e.g., data from replication session 1 is sent three times as often as data from replication sessions 1 and 2).

Figure 4:
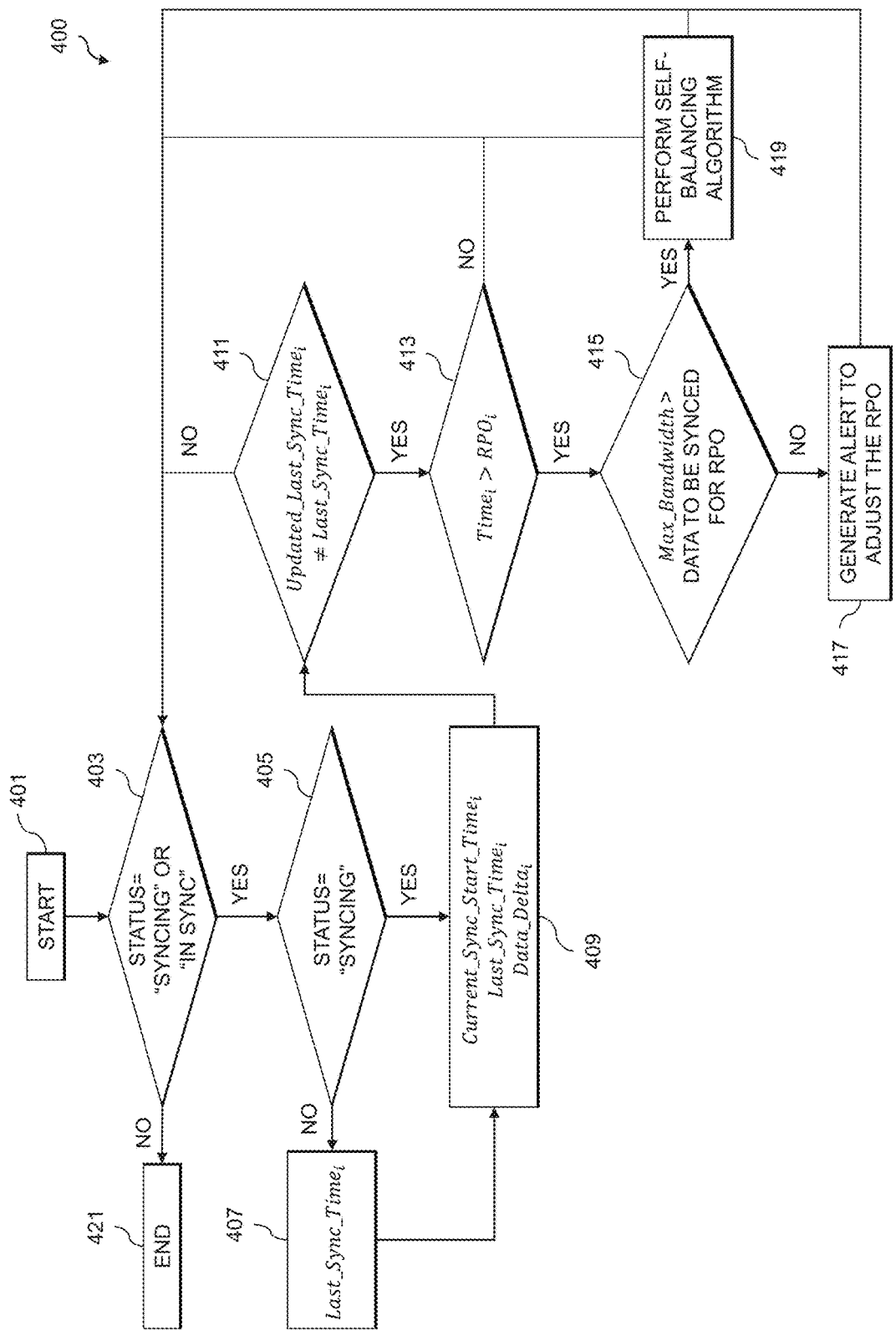
FIG. 4 shows a process flow for performing balancing among asynchronous replication sessions in an illustrative embodiment.

For each replication session, if the session sync time exceeds the RPO, a storage system will trigger the self-balancing algorithm 303 (e.g., between the failed session and the healthy sessions). FIG. 4 shows a process flow 400 for implementing the self-balancing algorithm 303. An iteration starts in step 401, and replication session status is checked in step 403. If the replication status for a replication session i is "syncing" or "in sync", the process flow 400 proceeds to step 405. Otherwise, the process flow 400 ends in step 421. If it is determined in step 405 that the replication session i's status is not "syncing" (e.g., that it is "in sync"), the process flow 400 proceeds to step 407 where the Last_Sync_Time$_i$ is recorded. If it is determined in step 405 that the replication session i's status is "syncing" then Current_Sync_Start_Time$_i$, Last_Sync_Time$_i$, and Data_Delta$_i$ for the replication session i are recorded in step 409.

In step 411, a determination is made as to whether an updated last sync time for replication session i, denoted Updated_Last_Sync_Time$_i$, is different than Last_Sync_Time$_i$. If the result of the step 411 determination is no, the process flow returns to step 403. If the result of the step 411 determination is yes, the process flow 400 proceeds to step 413 where Time$_i$ is determined and compared against RPO$_i$. Time$_i$ may be computed as a difference between Last_Sync_Time$_i$ and Current_Sync_Start_Time$_i$:

Time$_i$=Last_Sync_Time$_i$−Current_Sync_Start_Time$_i$

If Time$_i$<RPO$_i$ (e.g., the result of the step 413 determination is no), then the process flow 400 returns to step 403. If Time$_i$>RPO (e.g., the result of the step 413 determination is yes), then the process flow 400 proceeds to step 415 where a determination is made as to whether the total bandwidth capacity (Max_Bandwidth) is greater than the data to be synced for the replication session i's RPO$_i$. If the result of the step 415 determination is no, i.e., if $$\text{Max\_Bandwidth} * \text{High\_Watermark} * RPO_i < \sum_{n=1}^{k}\left(\left(\frac{\text{Data\_Delta}_n}{RPO_n}\right)*RPO_i\right)$$

then the process flow 400 proceeds to step 417 where an alert may be generated and sent to a customer or other end-user to inform them that the bandwidth capacity cannot sync data for the replication session i in accordance with its associated RPO$_i$.

If the result of the step 415 determination is yes, i.e., if $$\text{Max\_Bandwidth} * \text{High\_Watermark} * RPO_i < \sum_{n=1}^{k}\left(\left(\frac{\text{Data\_Delta}_n}{RPO_n}\right)*RPO_i\right)$$

then the process flow 400 proceeds to step 419 where the self-balancing algorithm 303 is performed. Following step 419, the process flow returns to step 403. The self-balancing algorithm 303 performed in step 419 may include computing replication session weights for use in performing bandwidth self-balancing between failed and healthy replication sessions. The session weight for replication session i is determined according to:

$$\text{Session\_Weight}_i = \frac{\text{Data\_Delta}_i}{\sum_{n=1}^{k}\left(\left(\frac{\text{Data\_Delta}_n}{RPO_n}\right)*RPO_i\right)}$$

The proportions between each of the k replication sessions is then calculated according to:

Session_W$_1$:Session_Weight$_2$: . . . :Session_Weight$_k$ where:

$$\text{Session\_Weight}_1 = \frac{\text{Data\_Delta}_1}{\sum_{n=1}^{k}\left(\left(\frac{\text{Data\_Delta}_n}{RPO_n}\right)*RPO_1\right)}$$

$$\text{Session\_Weight}_2 = \frac{\text{Data\_Delta}_2}{\sum_{n=1}^{k}\left(\left(\frac{\text{Data\_Delta}_n}{RPO_n}\right)*RPO_2\right)}$$

$$\text{Session\_Weight}_k = \frac{\text{Data\_Delta}_K}{\sum_{n=1}^{k}\left(\left(\frac{\text{Data\_Delta}_n}{RPO_n}\right)*RPO_K\right)}$$

In the FIG. 3 example, the sessions 1, 2 and 3 have weight proportions 3:1:1 (e.g., where data from the input queue 301-1 for replication session 1 is placed in the output queue 305 three times as often as data from the input queues 301-2 and 301-3 for replication sessions 2 and 3).

Figure 5B:
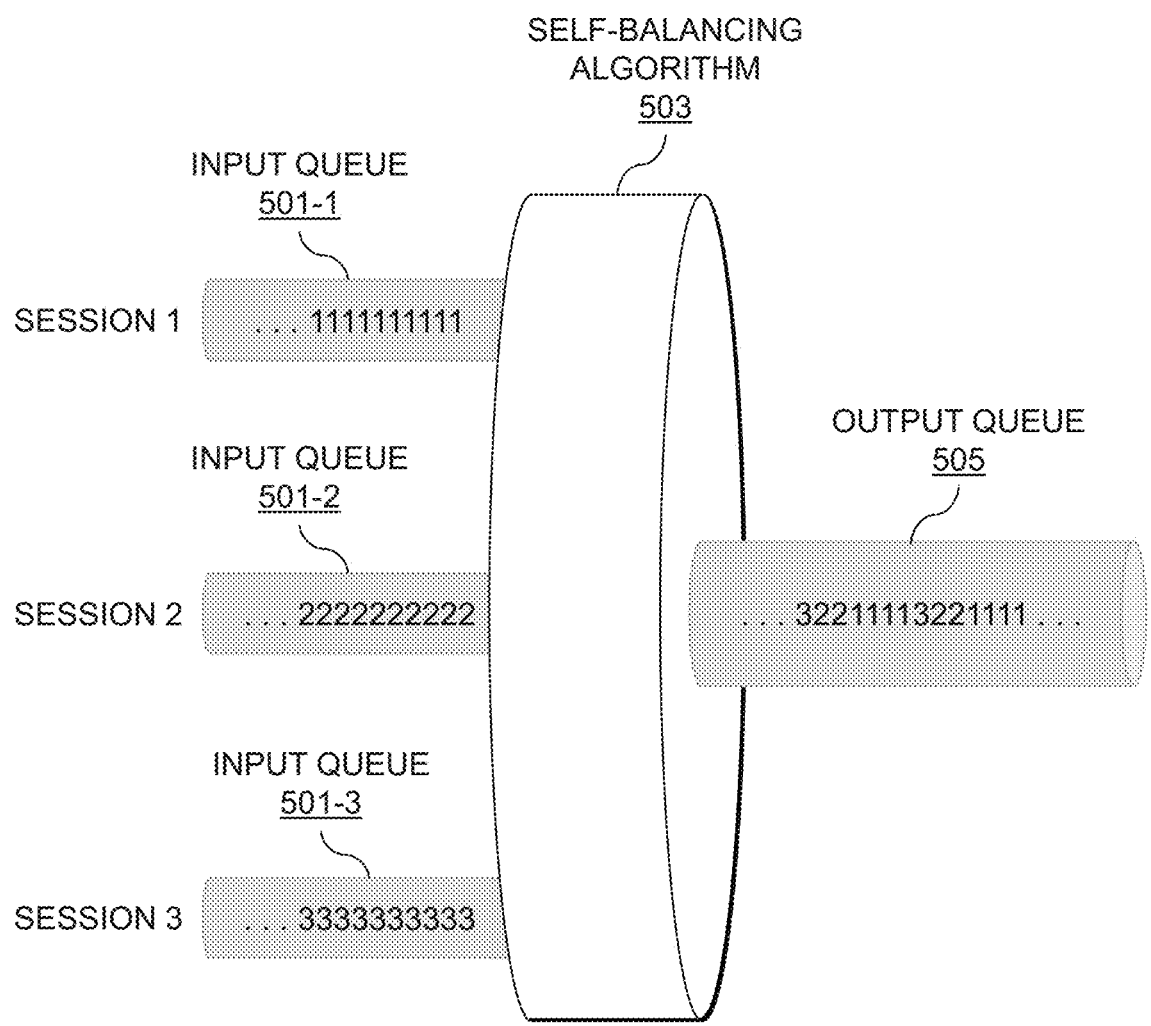

FIGS. 5A and 5B show an example of calculation of session weights for a self-balancing algorithm 503. In this example, it is assumed that there are three replication sessions with different customer or end-user specified RPOs as shown in table 500 of FIG. 5A. Here, the replication session 1 has an RPO of 5 minutes, the replication session 2 has an RPO of 10 minutes, and the replication session 3 has an RPO of 20 minutes. Here, the Max_Bandwidth is set as 10 gigabytes per second (Gb/s). The replication session 1 has Data_Delta$_1$ set to 120000 megabytes (MB), the replication session 2 has Data_Delta$_2$ set to 120000 MB, and the replication session 3 has Data_Delta$_3$ set to 120000 MB. Table 525 of FIG. 5A shows Last_Sync_Time$_i$ and Current_Sync_Start_Time$_i$ values for the replication sessions 1, 2 and 3. In this example, the replication session 1's synced data will exceed its associated RPO, and thus the total bandwidth capacity (Max_Bandwidth) is compared with the data that will be synced in the associated RPO:

$$\text{Max\_Bandwidth} * \text{High\_Watermark} * RPO_i =$$

$$276480 \text{ MB} \sum_{n=1}^{k}\left(\left(\frac{\text{Data\_Delta}_n}{RPO_n}\right)*RPO_i\right) = 210000 \text{ MB}$$

Here, the self-balancing algorithm 503 applied to the data for replication sessions 1, 2 and 3 in respective input queues

501-1, 501-2 and 501-3 (collectively, input queues 501) as shown in FIG. 5B results in adjusting the proportion of replication session weights according to:

Session_Weight$_1$:Session_Weight$_2$:
Session_Weight$_3$=4:2:1

Following application of the self-balancing algorithm 503, the data from the input queues 501 are selected for insertion to the output queue 505 in WRR scheduling that follows this proportion as illustrated in FIG. 5B. Then, in the idle status replication session 1 can send out 157988.57 MB data in 5 minutes, which will not exceed the RPO time for replication session 1.

The techniques described herein advantageously enable tracking of asynchronous replication capacity in real time, automatically. Customers or other end-users can thus be given a clear understanding of replication capacity, both for the whole storage array or other storage system, and for individual replication sessions, which helps for planning and updating configurations (e.g., RPOs of replication sessions, bandwidth allocated for replication, etc.). Further, the bandwidth between failed and health replication sessions will be re-balanced automatically if the overall asynchronous replication capacity does not exceed a high watermark. Alerts may also be generated and provided to help customers or other end-users identify the critical replication sessions when the asynchronous replication capacity is nearly full.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for selection of data for transmission from different asynchronous data replication sessions running on a storage system will now be described in greater detail with reference to FIGS. 6 and 7. Although described in the context of system 100, these platforms may also be used to implement at least portions of other information processing systems in other embodiments.

Figure 6:
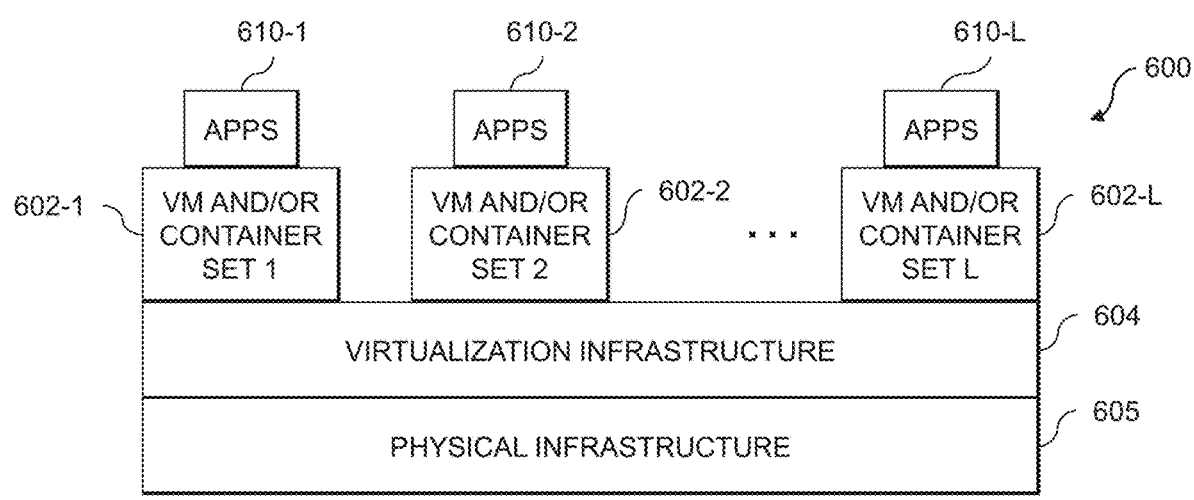
FIGS. 6 and 7 show examples of processing platforms that may be utilized to implement at least a portion of an information processing system in illustrative embodiments.
Figure 7:
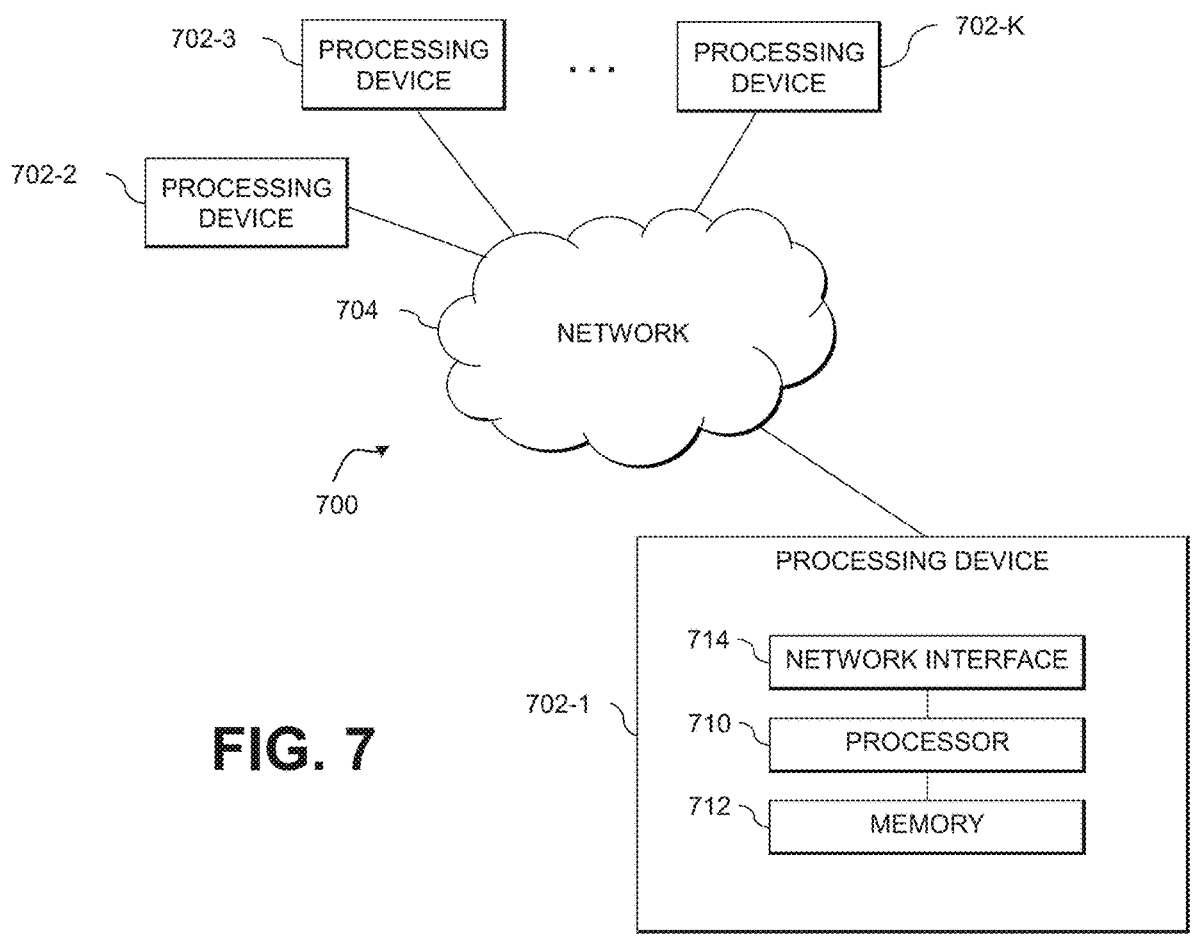

FIG. 6 shows an example processing platform comprising cloud infrastructure 600. The cloud infrastructure 600 comprises a combination of physical and virtual processing resources that may be utilized to implement at least a portion of the information processing system 100 in FIG. 1. The cloud infrastructure 600 comprises multiple virtual machines (VMs) and/or container sets 602-1, 602-2, . . . 602-L implemented using virtualization infrastructure 604. The virtualization infrastructure 604 runs on physical infrastructure 605, and illustratively comprises one or more hypervisors and/or operating system level virtualization infrastructure. The operating system level virtualization infrastructure illustratively comprises kernel control groups of a Linux operating system or other type of operating system.

The cloud infrastructure 600 further comprises sets of applications 610-1, 610-2, . . . 610-L running on respective ones of the VMs/container sets 602-1, 602-2, . . . 602-L under the control of the virtualization infrastructure 604. The VMs/container sets 602 may comprise respective VMs, respective sets of one or more containers, or respective sets of one or more containers running in VMs.

In some implementations of the FIG. 6 embodiment, the VMs/container sets 602 comprise respective VMs implemented using virtualization infrastructure 604 that comprises at least one hypervisor. A hypervisor platform may be used to implement a hypervisor within the virtualization infrastructure 604, where the hypervisor platform has an associated virtual infrastructure management system. The underlying physical machines may comprise one or more distributed processing platforms that include one or more storage systems.

In other implementations of the FIG. 6 embodiment, the VMs/container sets 602 comprise respective containers implemented using virtualization infrastructure 604 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 600 shown in FIG. 6 may represent at least a portion of one processing platform. Another example of such a processing platform is processing platform 700 shown in FIG. 7.

The processing platform 700 in this embodiment comprises a portion of system 100 and includes a plurality of processing devices, denoted 702-1, 702-2, 702-3, . . . 702-K, which communicate with one another over a network 704.

The network 704 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 702-1 in the processing platform 700 comprises a processor 710 coupled to a memory 712.

The processor 710 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 712 may comprise random access memory (RAM), read-only memory (ROM), flash memory or other types of memory, in any combination. The memory 712 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for selection of data for transmission from different asynchronous data replication sessions running on a storage system as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, storage systems, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
   at least one processing device comprising a processor coupled to a memory;
   the at least one processing device being configured to perform steps of:
   identifying a set of two or more asynchronous data replication sessions currently running on a storage system, each of the two or more asynchronous data replication sessions being associated with a corresponding recovery point objective;
   determining whether any of the asynchronous data replication sessions in the set of two or more asynchronous data replication sessions has a current synchronization time that exceeds its corresponding recovery point objective for a first iteration of a given time window;
   responsive to determining that at least one of the asynchronous data replication sessions in the set of two or more asynchronous data replication sessions has a current synchronization time that exceeds its corresponding recovery point objective for the first iteration of the given time window, computing a session weight for each of the asynchronous data replication sessions in the set of two or more asynchronous data replication sessions;
   selecting, for a second iteration of the given time window, data for transmission from each of the asynchronous data replication sessions in the set of two or more asynchronous data replication sessions based at least in part on the computed session weights; and
   transmitting, during the second iteration of the given time window, the selected data from each of the asynchronous data replication sessions in the set of two or more asynchronous data replication sessions.

2. The apparatus of claim 1 wherein a length of the given time window is set as a least common multiple of permissible synchronization times specified by the recovery point objective corresponding to each of the set of two or more asynchronous data replication sessions.

3. The apparatus of claim 1 the current synchronization time for a given asynchronous data replication session in the set of two or more asynchronous data replication sessions is determined based at least in part on a synchronization cost time of current delta data for the given asynchronous data replication session transferred during the first iteration of the given time window.

4. The apparatus of claim 3 wherein the current delta data for the given asynchronous data replication session transferred during the first iteration of the given time window is calculated based on a comparison of two storage system snapshot deltas for the given asynchronous data replication session.

5. The apparatus of claim 3 wherein the synchronization cost time comprises a difference between a last synchronization time for the given asynchronous data replication session and a start time of a current synchronization session in the first iteration of the given time window for the given asynchronous data replication session.

6. The apparatus of claim 1 wherein computing a given session weight for a given asynchronous data replication session in the set of two or more asynchronous data replication sessions is based at least in part on (i) a size of delta data for the given asynchronous data replication session that is transferred during the first iteration of the given time window and (ii) a given recovery point objective associated with the given asynchronous data replication session.

7. The apparatus of claim 6 wherein computing the given session weight for the given asynchronous data replication session is further based at least in part on (iii) ratios of the sizes of delta data and the recovery point objectives for all of the set of two or more asynchronous data replications sessions.

8. The apparatus of claim 1 wherein selecting the data for transmission from each of the asynchronous data replication sessions in the set of two or more asynchronous data replication sessions for the second iteration of the given time window comprises performing a weighted round robin balancing algorithm utilizing the computed session weights.

9. The apparatus of claim 1 wherein the at least one processing device is further configured to perform the steps of:
   determining an amount of a total asynchronous data replication capacity of the storage system that is allocated to the set of two or more asynchronous data replication sessions during the first iteration of the given time window;
   responsive to determining that the amount of the total asynchronous data replication capacity of the storage system that is allocated to the set of two or more asynchronous data replication sessions during the first iteration of the given time window exceeds a designated threshold, initiating one or more remediation actions on the storage system.

10. The apparatus of claim 9 wherein at least one of the one or more remediation actions comprises adjusting the total asynchronous data replication capacity of the storage system.

11. The apparatus of claim 10 wherein the total asynchronous data replication capacity of the storage system is determined based at least in part on a physical capacity of one or more storage ports of the storage system allocated for performing asynchronous data replication for the storage system, and wherein adjusting the total asynchronous data replication capacity of the storage system comprises allocating one or more additional storage ports of the storage system for asynchronous data replication.

12. The apparatus of claim 10 wherein the total asynchronous data replication capacity of the storage system is determined based at least in part on a user-specified asynchronous data replication throttling threshold, and wherein adjusting the total asynchronous data replication capacity of the storage system comprises increasing the user-specified asynchronous data replication throttling threshold.

13. The apparatus of claim 9 wherein at least one of the one or more remediation actions comprises adjusting a given recovery point objective associated with a given asynchronous data replication session in the set of two or more asynchronous data replication sessions.

14. The apparatus of claim 9 wherein at least one of the one or more remediation actions comprises generating an alert indicating that at least one of: asynchronous data replication capacity of the storage system is running low; and at least a given asynchronous data replication session in the set of two or more asynchronous data replication sessions will not meet its corresponding recovery point objective.

15. A computer program product comprising a non-transitory processor-readable storage medium having stored therein program code of one or more software programs, wherein the program code when executed by at least one processing device causes the at least one processing device to perform steps of:
identifying a set of two or more asynchronous data replication sessions currently running on a storage system, each of the two or more asynchronous data replication sessions being associated with a corresponding recovery point objective;
determining whether any of the asynchronous data replication sessions in the set of two or more asynchronous data replication sessions has a current synchronization time that exceeds its corresponding recovery point objective for a first iteration of a given time window;
responsive to determining that at least one of the asynchronous data replication sessions in the set of two or more asynchronous data replication sessions has a current synchronization time that exceeds its corresponding recovery point objective for the first iteration of the given time window, computing a session weight for each of the asynchronous data replication sessions in the set of two or more asynchronous data replication sessions;
selecting, for a second iteration of the given time window, data for transmission from each of the asynchronous data replication sessions in the set of two or more asynchronous data replication sessions based at least in part on the computed session weights; and
transmitting, during the second iteration of the given time window, the selected data from each of the asynchronous data replication sessions in the set of two or more asynchronous data replication sessions.

16. The computer program product of claim 15 wherein computing a given session weight for a given asynchronous data replication session in the set of two or more asynchronous data replication sessions is based at least in part on (i) a size of delta data for the given asynchronous data replication session that is transferred during the first iteration of the given time window and (ii) a given recovery point objective associated with the given asynchronous data replication session.

17. The computer program product of claim 15 wherein selecting the data for transmission from each of the asynchronous data replication sessions in the set of two or more asynchronous data replication sessions for the second iteration of the given time window comprises performing a weighted round robin balancing algorithm utilizing the computed session weights.

18. A method comprising:
identifying a set of two or more asynchronous data replication sessions currently running on a storage system, each of the two or more asynchronous data replication sessions being associated with a corresponding recovery point objective;
determining whether any of the asynchronous data replication sessions in the set of two or more asynchronous data replication sessions has a current synchronization time that exceeds its corresponding recovery point objective for a first iteration of a given time window;
responsive to determining that at least one of the asynchronous data replication sessions in the set of two or more asynchronous data replication sessions has a current synchronization time that exceeds its corresponding recovery point objective for the first iteration of the given time window, computing a session weight for each of the asynchronous data replication sessions in the set of two or more asynchronous data replication sessions;
selecting, for a second iteration of the given time window, data for transmission from each of the asynchronous data replication sessions in the set of two or more asynchronous data replication sessions based at least in part on the computed session weights; and
transmitting, during the second iteration of the given time window, the selected data from each of the asynchronous data replication sessions in the set of two or more asynchronous data replication sessions;
wherein the method is performed by at least one processing device comprising a processor coupled to a memory.

19. The method of claim 18 wherein computing a given session weight for a given asynchronous data replication session in the set of two or more asynchronous data replication sessions is based at least in part on (i) a size of delta data for the given asynchronous data replication session that is transferred during the first iteration of the given time window and (ii) a given recovery point objective associated with the given asynchronous data replication session.

20. The method of claim 18 wherein selecting the data for transmission from each of the asynchronous data replication sessions in the set of two or more asynchronous data replication sessions for the second iteration of the given time window comprises performing a weighted round robin balancing algorithm utilizing the computed session weights.

* * * * *